Feb. 22, 1944.   E. WILDHABER   2,342,232
METHOD AND MACHINE FOR PRODUCING GEARS
Filed March 19, 1940   8 Sheets-Sheet 1
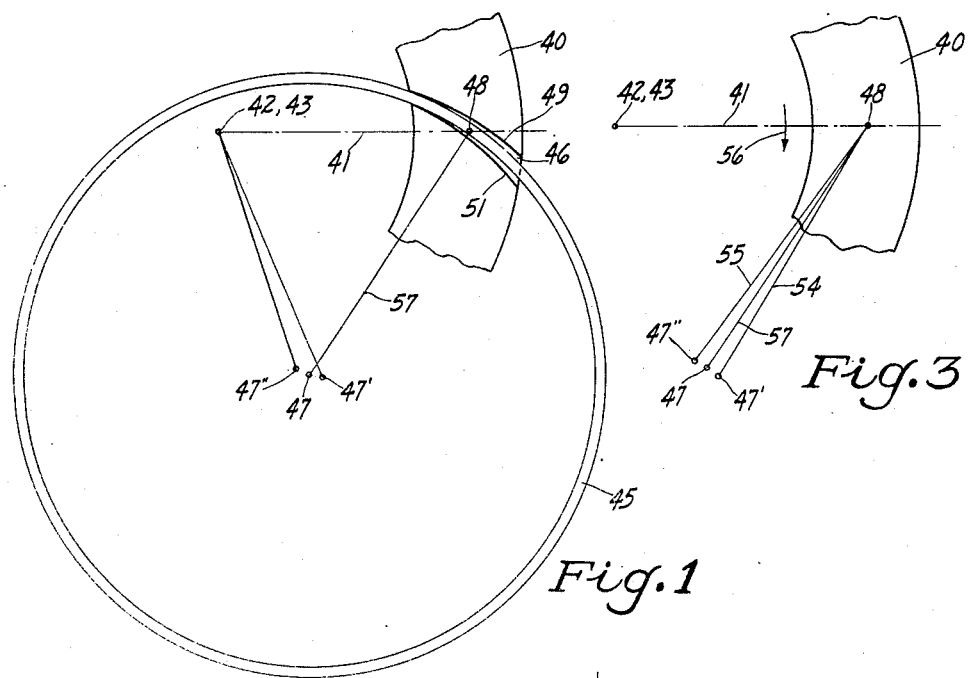
Fig.1
Fig.3
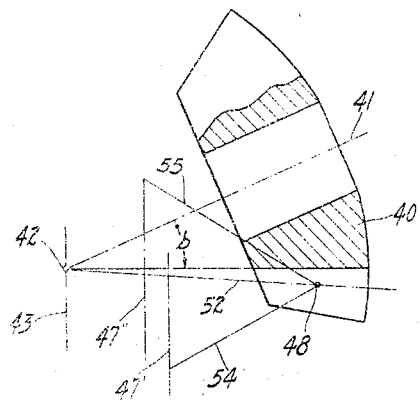
Fig.2
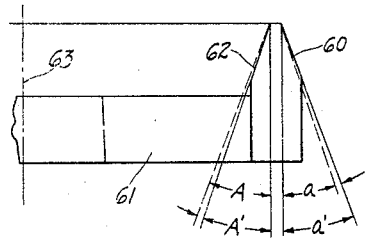
Fig.4
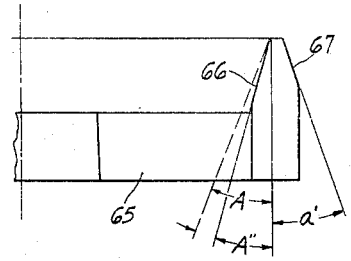
Fig.5
Inventor
ERNEST WILDHABER
By
B. E. Shlesinger
Attorney Inventor
ERNEST WILDHABER Inventor
ERNEST WILDHABER Feb. 22, 1944.  E. WILDHABER  2,342,232
METHOD AND MACHINE FOR PRODUCING GEARS
Filed March 19, 1940    8 Sheets-Sheet 4

Inventor
ERNEST WILDHABER
By
Attorney

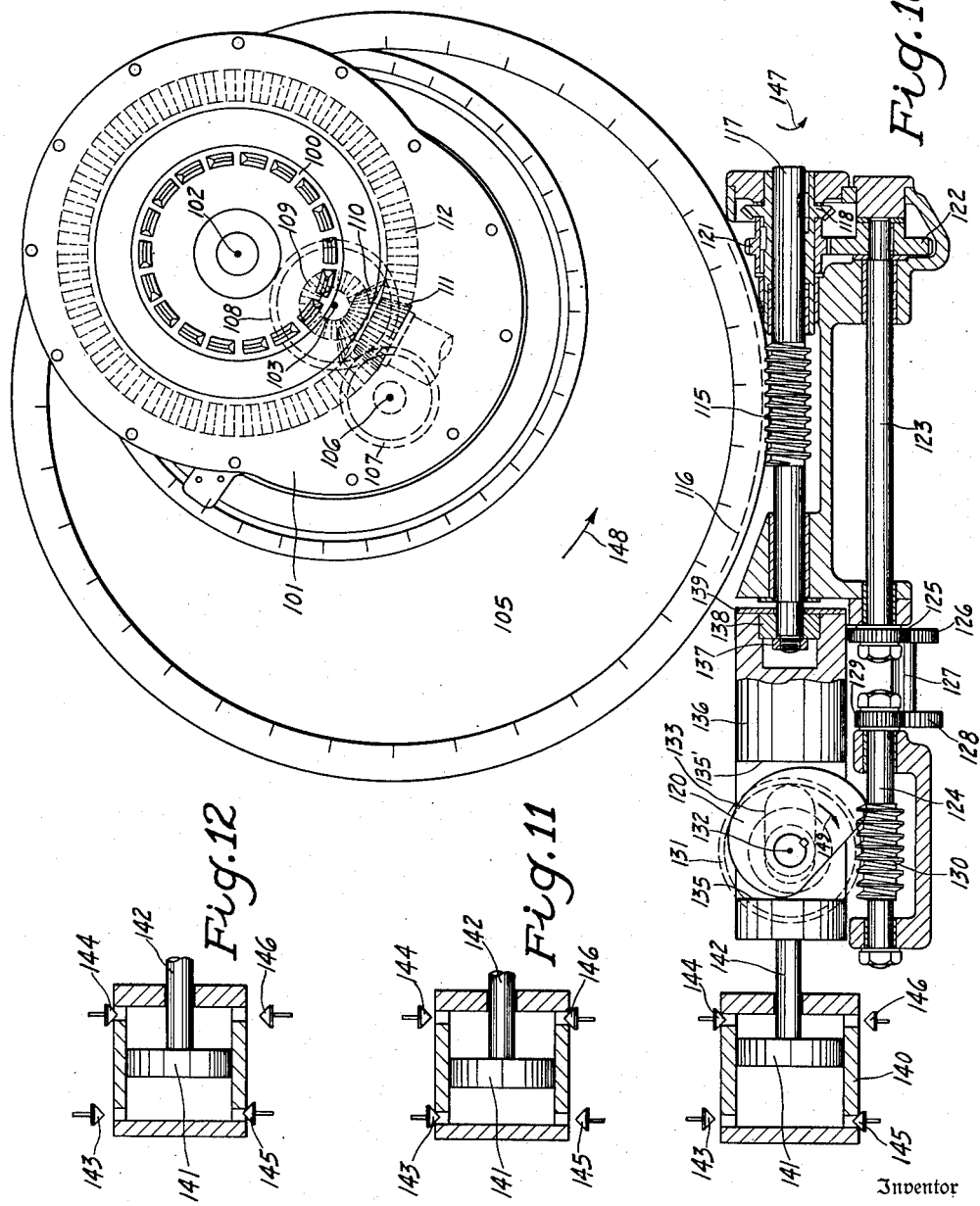

Inventor
ERNEST WILDHABER
By B. E. Schlesinger
Attorney

Feb. 22, 1944.   E. WILDHABER   2,342,232
METHOD AND MACHINE FOR PRODUCING GEARS
Filed March 19, 1940   8 Sheets-Sheet 7

Inventor
ERNEST WILDHABER
By B. E. Shlesinger
Attorney

Feb. 22, 1944.    E. WILDHABER    2,342,232
METHOD AND MACHINE FOR PRODUCING GEARS
Filed March 19, 1940    8 Sheets-Sheet 8

Inventor
ERNEST WILDHABER
By
Attorney

Patented Feb. 22, 1944

2,342,232

UNITED STATES PATENT OFFICE 2,342,232

METHOD AND MACHINE FOR PRODUCING GEARS

Ernest Wildhaber, Brighton, N. Y., assignor to Gleason Works, Rochester, N. Y., a corporation of New York Application March 19, 1940, Serial No. 324,827

33 Claims. (Cl. 90—5)

The present invention relates to methods and apparatus for producing gears and particularly to a method and apparatus for producing spiral bevel and hypoid pinions.

In the production of spiral bevel and hypoid gears, it has been and is the almost universal practice both in roughing and in finishing the ring gear or larger member of the pair, to cut opposite sides of its tooth spaces simultaneously with a face-mill gear cutter having opposite side cutting blades. Thus tooth spaces are cut both in the roughed gear and in the finished gear which have opposite sides curved about a common center and which are of uniform width from end to end.

Until very recent years, it was also the almost universal practice to rough-cut the tooth spaces of the pinion two sides simultaneously with a face-mill gear cutter having opposite side-cutting blades. The roughed tooth spaces of the pinion, therefore, like the roughed tooth spaces of the gear, were of uniform width and had opposite sides curved about a common center. The necessary taper in width of the tooth spaces of the pinion, which is required to obtain proper mesh with the teeth of the mating ring gear, is produced in the finishing operation by cutting one side of the pinion teeth at a time, opposite sides being cut from different centers. The gear may be roughed and finished with or without generating roll, but it is the standard practice both to rough and finish cut the pinion with generating roll.

Where the tooth spaces of either a gear or pinion are rough-cut to be of uniform width from end to end and the tooth spaces have subsequently to be cut to tapered width in a finishing operation, a considerable burden is put on the finishing cutter. Moreover, the finishing operation is slowed up to the extent that stock must be removed during the finishing cut which should be removed in a roughing operation.

In recent years, therefore, different attempts have been made to rough pinions closer to size by rough-cutting them with a tapered slot. In one such attempt, a pinion roughing machine has been built with mechanism for shifting the cutter radially of the cradle axis between forward and return generating movements of the cradle. Cutter and blank are rolled together in one direction to rough out a slot of uniform width, then the cutter is shifted on the cradle so that it will cut from a different center, and on the return roll, a further cut is taken in the tooth space with the cutter at the new center, thereby to widen out and taper-cut the slot.

While this attempt was successful, it was found that the roughing of the pinions was slowed up considerably, as compared with the single-cut roughing method previously employed, due to the necessity for a double roll and a shift of the cutter center between rolls. Moreover, considerable complications were involved in the machine design.

For the purpose of reducing the cutting time, another pinion roughing machine has been built in which two face-mill cutters are employed that are mounted eccentrically of one another and therefore cut from different centers. These cutters are arranged to operate simultaneously, one roughing out the tooth slots to uniform width and the other subsequently recutting the slots to produce the taper cut. This machine has proved quite successful and has gone into widespread use, but it has the disadvantage of requiring two cutters and, moreover, it is not as simple or as universal as a single cutter machine. Moreover, it has been found that the error or departure of the tooth surfaces produced even with the taper cut is still quite considerable, especially in the case of "Formate" pinions, that is, pinions conjugate to non-generated gears.

A primary object of the present invention is to provide an improved process for rough-cutting spiral bevel and hypoid pinions which will be simple and fast and in which the tooth spaces of a pinion may be taper cut with a single cutter without change of cutter position.

A further object of the invention is to provide a process for roughing the teeth of spiral bevel and hypoid pinions very close to finished shape so that very little stock is left on the sides of the teeth to be removed in the finishing operation, so that the finishing cutters need take only very light cuts and the finishing operations can be sped up and the life of the finishing cutters prolonged.

A further object of the invention is to provide a roughing process in which roughing cutters of increased point-width may be employed which therefore will have longer life.

A still further object of the invention is to provide a roughing process which will permit of cutting the pinions close enough to finished size and shape to allow the roughed pinions to be tested in an actual running test, thus permitting easy determination of and correction for any variations between roughing machines, so that all roughing machines used on a particular job may be set to cut alike.

The present invention is not limited, however, to the rough cutting of pinions but may be employed also for semi-finish cutting them from the solid. Thus pinions may be cut with the present invention from the solid with sufficient accuracy to enable them to be ground or shaved without any further intermediate cutting operation. In some cases, indeed, the present invention may be used directly for finish-cutting.

In the process of the present invention, as already indicated, both sides of a tooth space of a pinion are cut with the same face-mill cutter. The cutter is rotated in engagement with the pinion blank, while cutter and blank are rolled together first in one direction and then in the other. There is no change made, however, in the position of the cutter radially of the cradle axis (axis of the basic generating gear) between the up and down rolls. The desired taper in width of the tooth slots of the pinion is produced, instead, by employing different ratios of roll during the forward and return generating movements. To secure the desired pressure angles on the two sides of the pinion teeth, the pressure angles of the blades for cutting one side of the teeth are preferably increased and the pressure angles of the blades for cutting the opposite side of the teeth are preferably decreased, over the pressure angles of a standard cutter, in conformity with the different ratios of roll used for cutting the two sides. It is as though the pinion were rolling with one basic gear represented by the cutter during the uproll and with a different basic gear represented by the cutter during the return roll. The differences in the two basic gears are slight but sufficient to produce the desired taper in width of the tooth spaces of the pinion. Moreover, by modifying the ratios of roll during cutting on either or both the forward and return generating movements, the profile shapes cut on the pinion teeth can be controlled so that the tooth profiles roughed on the pinions may approach, as desired, very closely to the finished profile shapes.

The included angle between the opposite side-cutting edges of a cutter used with the present process may be equal to the sum of the pressure angles of opposite sides of the pinion teeth. Then on the average the pinion rolls with its pitch surface on the pitch surface of the basic gear represented by the cutter. The included angle between opposite side cutting edges of the cutter may be increased or decreased, however, over the included angle between opposite sides of the pinion teeth. Then the increase or decrease may be compensated for in known manner by rolling the cutter and work relative to one another as though the work were rolling with a surface outside of or inside of its pitch surface, respectively, on the pitch surface of the basic gear represented by the cutter.

The present invention may be practiced with but slight modification of existing bevel and hypoid pinion generating machines. For instance, on a machine on which the cutter is mounted on the cradle and the cradle and work spindle are rotated in timed relation to effect generation of the tooth profiles, and the cradle is driven through a worm and worm wheel, means may be provided for moving the cradle worm axially simultaneously with its rotation and such means may be constructed to produce a different axial movement of the cradle worm during roll of the cradle in one direction from that produced during roll in the opposite direction. A cam or eccentric driven in time with the rotary movement of the cradle worm may be employed for this purpose. In one embodiment of the invention, a plate is provided on which is eccentrically mounted a pair of rollers. Fluid pressure operated means is employed to hold the cradle worm in operative relation selectively with one or other of the rollers so that as the plate is oscillated in opposite directions during roll of the cradle in opposite directions, the worm is moved axially different amounts to effect the desired change in ratio of roll. The two rollers are arranged to be adjusted to different angular positions about the axis of the plate so that when one roller is in operative position, a different amount of axial movement of the cradle worm will be produced on rotation of the plate than when the other roller is in operative position.

With the present invention, the point-width of the cutter used is limited only by the width of the tooth spaces of the pinion at the small end. It may in fact be made equal to the width of the roughed tooth space at the small end, if desired. If the point-width of the cutter is less than the width of the tooth space at the small end, then a slight movement of the cradle between the roll in opposite directions is required so that the cutter will cut the required width of the tooth space. This slight movement may be effected by slight axial movement of the cradle worm at the ends of the roll through operation of the same fluid-pressure operated means that is employed to hold the cradle worm in operative engagement with the member that effects the modification in ratio of roll.

In the drawings:

Figs. 1 to 3, inclusive, are diagrammatic views illustrating the theory underlying the present invention, Fig. 1 being a diagrammatic developed view of a pinion and cutter, Fig. 2 an axial section through the pinion, and Fig. 3 a developed view of the pinion, but illustrating further certain geometrical relations;

Fig. 4 is a diagrammatic view illustrating how the pressure angle of one side of a cutter may be increased and the other side decreased for cutting pinions according to the present invention;

Fig. 5 is a corresponding view showing a change in pressure angle effected on one side of the cutter only;

Fig. 10 is a front elevational view of the cradle of a machine built to cut pinions according to the process of the present invention and illustrating in section and somewhat diagrammatically the mechanism for producing the required variation in ratio of roll;

Figs. 11 and 12 are diagrammatic views illustrating the operation of the hydraulic mechanism for holding the cradle worm in operative relation to the means for moving the worm axially;

Figure 35:
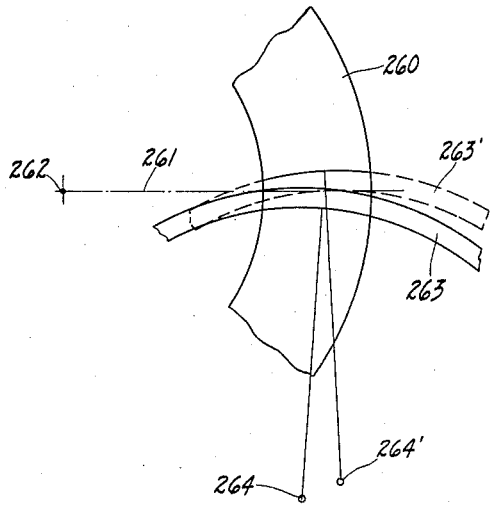
Figure 36:
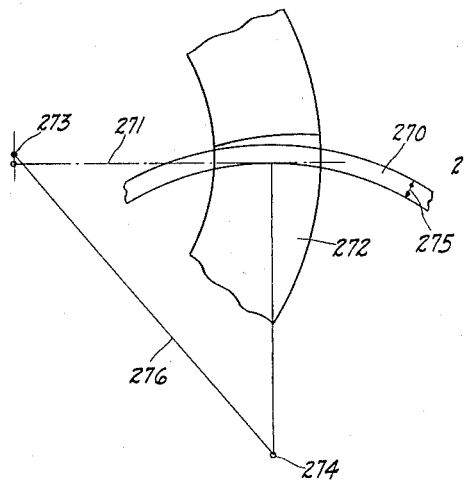
Figure 37:
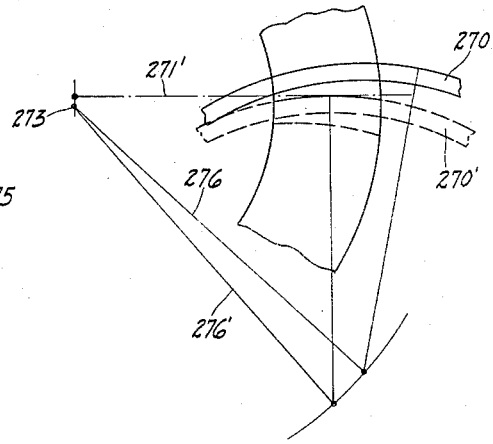
Figure 27:
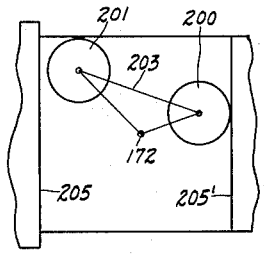
Figure 28:
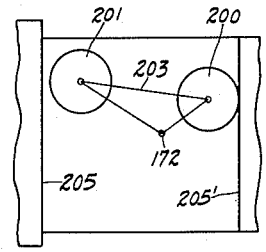
Figure 32:
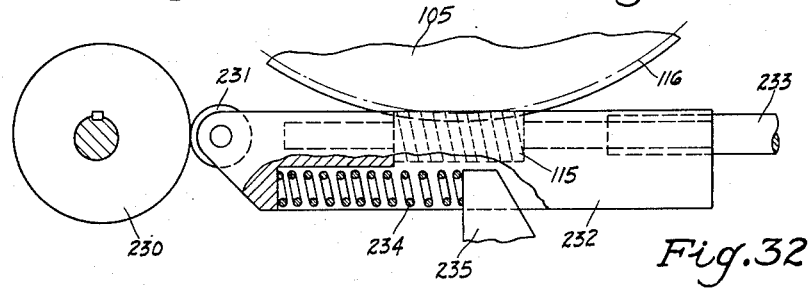
Figures 33, 34:
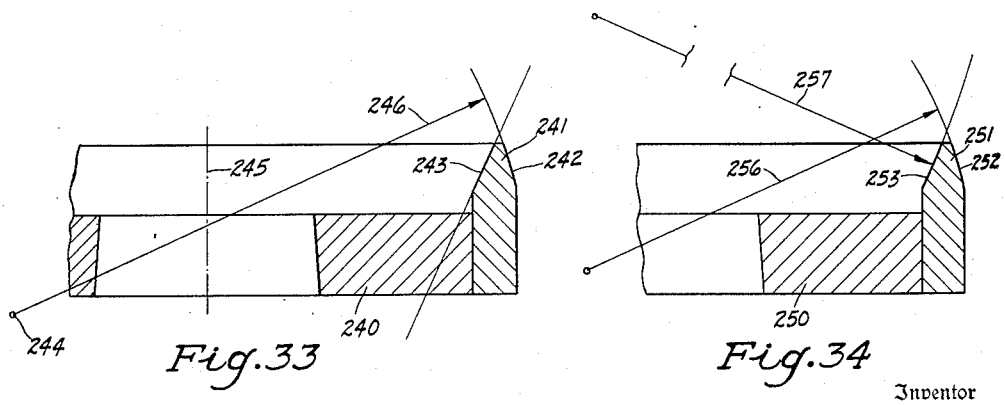
Figure 29:
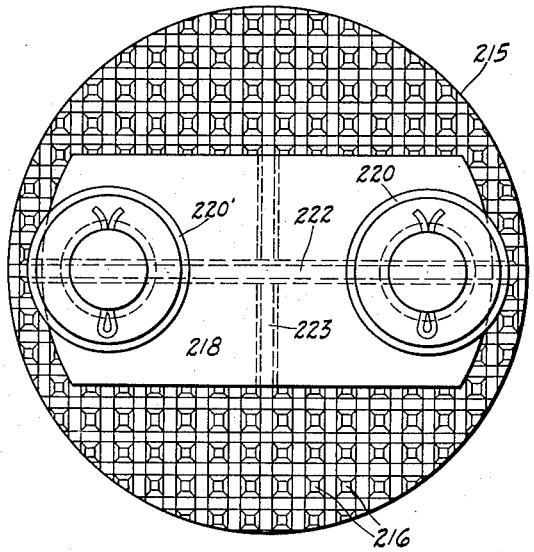
Figure 30:
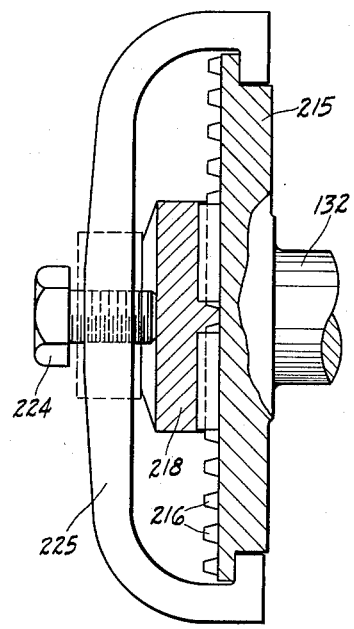
Figure 31:
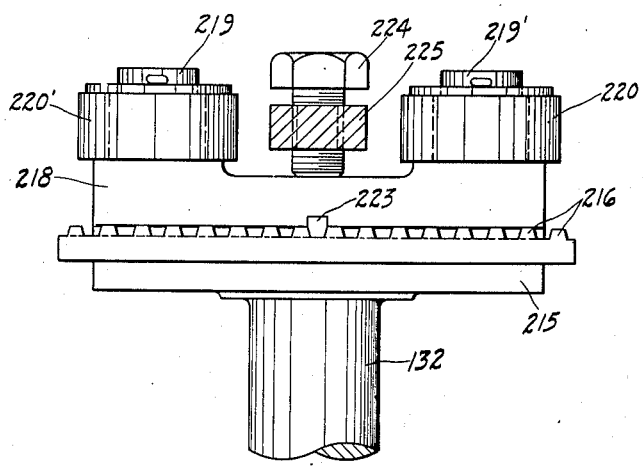

Figs. 21 to 28, inclusive, are diagrammatic views of the present preferred form of mechanism for modifying the ratio of generating roll and illustrating various ways in which this mechanism may be adjusted to obtain different modifications in ratio of roll;

Fig. 29 is a front elevation, Fig. 30 a section, and Fig. 31 a side elevation, with parts broken away, of a universal type control member constructed according to the principles illustrated in Figs. 21 to 28, inclusive;

Fig. 32 is a diagrammatic view illustrating a still further means for producing axial movement of the cradle worm to obtain a modification of the ratio of roll;

Fig. 33 is a fragmentary sectional view of one form of cutter that may be employed with the present invention to obtain profile shapes on the pinion teeth which more nearly approach a desired finished shape than could be obtained with a standard straight-sided cutter;

Fig. 34 is a similar view of another modification of cutter;

Fig. 35 is a diagrammatic view illustrating a modification of the invention as applied to the production of pinions having teeth of zero spiral angle; and Figs. 36 and 37 are diagrammatic views illustrating a still further modification of the invention as applied to the cutting of teeth of pinions of zero spiral angle.

Reference will now be had to the drawings for a more detailed description of the invention. In Figs. 1 to 3, inclusive, 40 denotes a spiral bevel pinion, 41 its axis and 42 its apex. 46 denotes a tooth space which is to be cut. 45 denotes the top of a face-mill gear cutter which may be used to cut the pinion. It is assumed that this cutter has opposite side cutting edges whose pressure angles are equal, respectively, to the root-line pressure angles of opposite side surfaces on the teeth of the pinion which is to be cut. b is the root angle of the pinion. 43 is the axis of the basic gear to which the pinion is to be cut conjugate. This is the axis about which the relative generating roll of cutter and blank takes place during cutting.

As will be noted from Fig. 1, the tooth slot 46 increases in width from the small to the large end of the pinion in accordance with usual practice. The cutter 45 is shown disposed centrally of the tooth slot with its axis at 47. 48 is a mean point of the tooth space.

To produce the desired taper in width of the tooth slot 46, theoretically the axis of the cutter 45 should be at 47′ when generating the side 49 of the tooth space. Likewise, theoretically, the axis of the cutter should be at 47″ when generating the side 51 of the tooth space. Distance 47′—42 ordinarily is larger than distance 47″—42. This is particularly the case when the gear, which is to mate with the pinion, has been cut by the "spread-blade" method, that is, has had its tooth spaces cut two sides simultaneously from a common center. Prior practice has been to follow theoretical considerations and use different radial positions of the cutter when cutting the opposite sides of the pinion tooth spaces, respectively, but to use the same ratio of roll between the cutter (basic gear) and the work when generating the two sides. In the illustrated instance, the ratio used is such that 52 (Fig. 2) is the instantaneous axis of rolling motion between cutter (basic gear) and pinion during generation.

Let us now consider the principles on which the present invention is based. As stated, 54 and 55 are normals to opposite side tooth surfaces of the pinion at mean point 48. They are perpendicular to the tooth surfaces as well as to the outside and inside cutting surfaces of the cutter, respectively. Now it is apparent that, if these normals are rotated about the pinion axis 41 through a small angle in the direction of the arrow 56 (Fig. 3), although their inclinations to the root plane and to the projected pinion axis are changed, they will still remain tooth normals. Moreover, if suitable pressure angles are provided on the inside and outside cutting edges of the cutter, the normals 54 and 55 can also be maintained as cutter normals. In other words, despite the rotation about the pinion axis 41, it is still possible to have contact between the cutter and pinion on said normals at the point where the normals intersect the respective surfaces, provided that the kinematical conditions for tooth contact are fulfilled. Since with the described conditions, however, the pressure angles for opposite side cutting edges of the cutter will have changed and will now be unequal, it will be seen that to produce equal pressure angles on opposite sides of the pinion teeth, different ratios of roll will have to be employed between the cutter and the pinion during generation of the opposite sides of the pinion teeth. This is what is done in the present process.

For the purpose of further explanation of the principles on which the present invention rests, let us now assume that the cutter 45 is rotated back about the axis 43 of the basic generating gear through an angle corresponding to the angle through which it has been assumed that the pinion was turned about its axis 41 in the direction 56, and in a ratio equal to the ratio of roll used in conventional practice when generating opposite sides of the pinion teeth with the same ratio of roll. This rotary movement about the axis 43 of the generating gear evidently does not affect the relationship between this axis and the cutter axis, that is, it does not affect the quantities in which we are now interested and which are determined by the turning movement about the axis 41 of the pinion.

The total relative motion between the considered tooth normals and the axis 43 is then a rolling motion with an instantaneous axis 52. For small displacements, this rolling motion may be considered approximately as a simple rotary motion about the instantaneous axis 52. The said rotary motion changes the inclination of the tooth normals with reference to a plane perpendicular to the cutter axis, that is, it changes the pressure angles of the cutter and it changes the direction of the tooth normals in the view (Fig. 3) taken along the axis 43 of the generating gear. With a rotary displacement about the instantaneous axis 52 in direction 56, it will be seen that the projected normal 54 of the outside cutter surface is moved toward the mean projected normal 57 and that the projected normal 55 of the inside cutting surface of the cutter is also moved towards the mean projected normal 57. Thus it will be seen that the pressure angle required for the outside cutting edges of the cutter is increased and the pressure angle required for the inside cutting edges of the cutter is reduced, when the rotary displacement in the direction 56 is effected.

By properly selecting the angle of rotation in the direction 56, the projected normals 54 and 55 can be made to coincide with the mean normal 57 or to coincide with a joint mean normal so that the cutter axis may have the same distance from the axis 43 of the generating gear when cutting both sides of a tooth space of the pinion. In other words, by proper solution of the kinematical requirements, it is possible to cut both sides of a tooth space of a pinion which has tooth spaces tapering in width from end to end with the cutter positioned so that its axis is at the same radial distance from the axis 43 of the generating gear or cradle, provided that the cutter employed has the required pressure angles on its outside and inside cutting edges and provided that different ratios of roll are used for cutting the opposite sides of the tooth space.

Fig. 4 illustrates the character of the change in pressure angles required on the outside and inside cutting edges of a cutter for practicing the present invention. 60 and 62 denote, respectively, outside and inside cutting edges of a face-mill cutter 61 such as may be employed with the present process. Its axis is at 63. The pressure angle $a'$ of the outside cutting edges 60 of this cutter is greater than the pressure angle $a$ of the corresponding cutting edges of a cutter such as might be used in conventional practice, while the pressure angle $A'$ of the inside cutting blades 62, on the other hand, is made less than the pressure angle $A$ of the inside cutting edges of a cutter which would be employed in conventional practice. In other words, the pressure angle of the outside cutting blades of the cutter 61 is larger than, and the pressure angle of the inside cutting blades is smaller than the corresponding root line pressure angles of the pinion which is to be produced. Because of the change in pressure angles and to compensate therefor, the ratio of generating roll is larger when cutting with the inside blades of the cutter than when cutting with the outside blades.

Ordinarily the sum of the pressure angles of the outside and inside cutting blades of a cutter used for practicing the present invention would equal the sum of the normal pressure angles of the opposite sides of the teeth of the pinion to be cut. It is well known, however, that a pinion or gear may be cut with a cutter, the sum of whose pressure angles is either greater than or less than the sum of the pressure angles of the opposite sides of the pinion teeth. If the pressure angles of the cutter are greater than the pressure angles of the gear, the gear may be generated with a surface outside of its pitch surface rolling on the pitch surface of the basic gear represented by the tool. If the pressure angles of the cutter are less than the pressure angles of the gear, then the gear is rolled with a surface, which is inside its pitch surface, on the pitch surface of the basic gear represented by the tool.

The method of the present invention may also be employed when these known principles are followed. Obviously, the calculated pressure angle of the cutter may be changed on one side only. Thus, as shown in Fig. 5 a cutter 65 may be employed whose inside cutting edges have a pressure angle $A''$ which is reduced as compared with the root line pressure angle $A$ of the pinion to be cut and as compared with the pressure angle $A'$ of the inside blades of the cutter 61, but whose outside cutting blades have a pressure angle $a'$ the same as the root line pressure angle of the concave sides of the pinion teeth. This simply means that in cutting the convex sides of the pinion teeth, this added reduction in pressure angle of the inside cutting blades of the cutter must be taken into consideration in determining the ratio of generating roll between cutter and work.

Obviously, various combinations of the present invention with the known method of generation may be employed. Thus the pressure angle of the outside blades of the cutter may be increased and the included angle between outside and inside cutting edges may be increased also, or, on the other hand, both inside and outside pressure angles may be reduced and the included angle between outside and inside cutting edges reduced.

Figure 6:
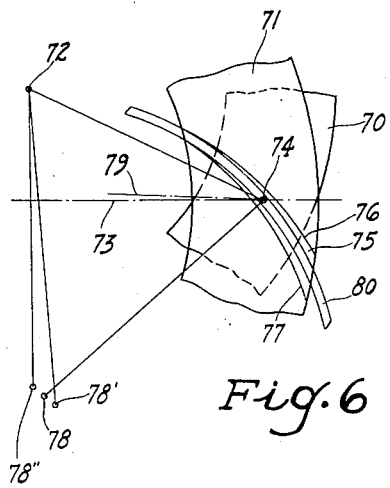
Fig. 6 is a diagrammatic view similar to Fig. 1 but illustrating the application of the invention to the production of hypoid pinions.

An application of the invention to the cutting of hypoid pinions is shown in Fig. 6. Here 70 and 71 denote, respectively, the developed pitch surfaces of the gear and pinion. 72 designates the apex or axis of the generating gear and 73 the pinion axis. 74 is a mean point of contact between gear and pinion. Ordinarily to cut longitudinally tapered tooth spaces 75 in the pinion 71, the opposite sides 76 and 77 of the pinion teeth are cut with the cutter axis disposed, respectively, at different radial distances from the axis 72 of the basic generating gear or cradle, as at 78' and 78'', respectively. With the process of the present invention, however, both sides 76 and 77 of the tapered tooth space 75 may be cut with the cutter axis at 78. That is, both sides of the tapered tooth space may be cut with the cutter at the same radial distance from the axis 72 of the generating gear or cradle. The equivalent of the instantaneous axis in this case is the intersection line of the surfaces of action for the two sides during generation. This is a line whose projection 79 usually approaches very closely to the projected pinion axis 73. As before, the pressure angle of the outside blades of the cutter is increased over and the pressure angle of the inside cutting blades of the cutter is decreased from the root line pressure angle of opposite sides of the pinion teeth and different ratios of roll are employed for cutting opposite sides of the pinion teeth.

Figure 7:
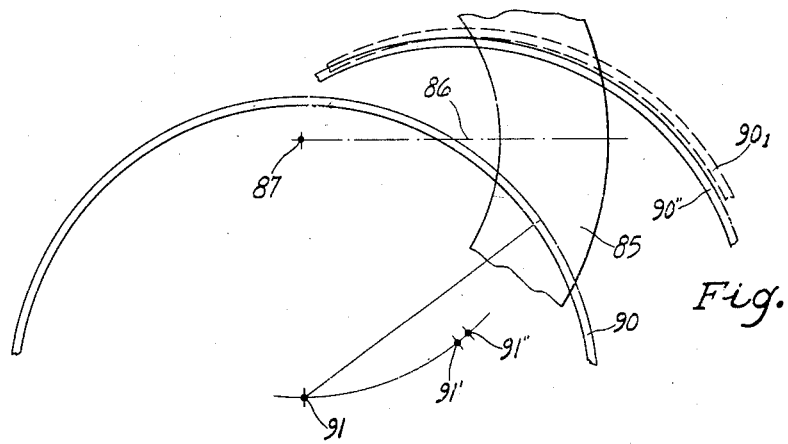
Fig. 7 is a diagrammatic view showing in plan the relative movements of the cutter and blank in the generation of a tooth space of a pinion according to the present invention.
Figure 8:
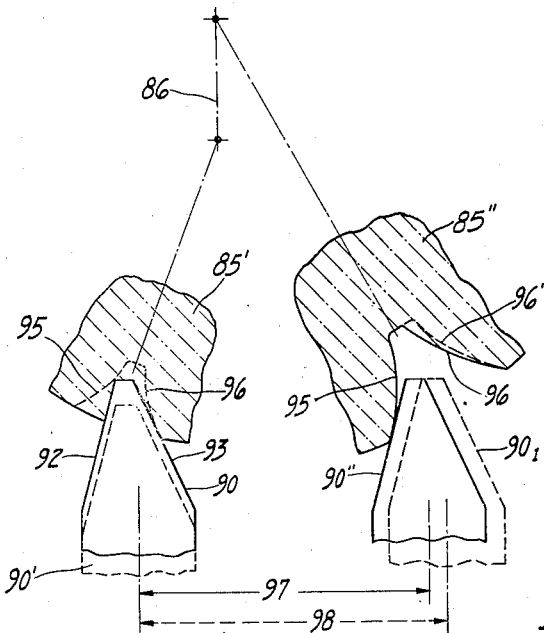
Fig. 8 is a view, showing the positions of the pinion and a blade of the cutter in section at both the beginning and the end of the generating roll and further illustrating the relative movements of cutter and pinion in the generation of a tooth space of the pinion.
Figure 9:
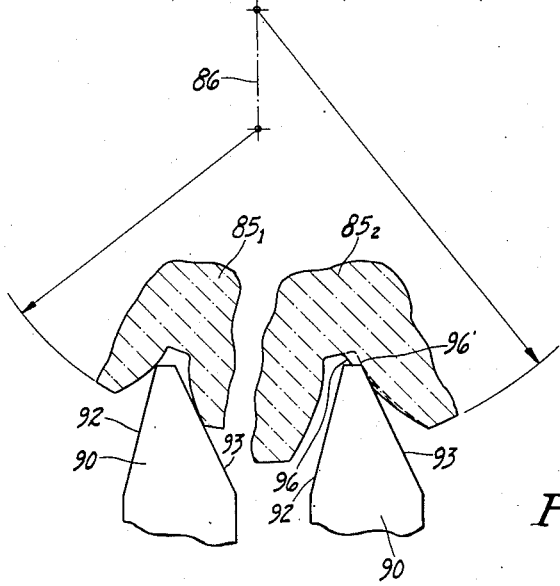
Fig. 9 is a similar view but illustrating the cutting action during the return roll only.

The process of the present invention is further illustrated in Figs. 7 to 9, inclusive. Here 85 denotes a spiral bevel pinion which is to be cut. 86 is its axis and 87 its apex. 90 denotes fragmentarily the face-mill cutter which is to be employed in generation of the tooth surfaces of the pinion, while 92 and 93 denote opposite side cutting edges of this cutter. The pinion is inclined to the cutting plane of the cutter by its root angle or any other suitable angle in order to obtain teeth tapering in depth from end to end. This angular adjustment of the pinion is indicated by the projection of the pinion axis 86 in Fig. 8.

It is assumed that the cutter starts cutting at the small end of the pinion blank with the axis of the cutter in the position 91 (Fig. 7). The cutter is first fed into depth, moving from the dotted line position 90' at the left hand side of Fig. 8 to the full line position denoted at 90. 85' here denotes a section through the pinion blank adjacent its small end.

When the cutter has reached full depth position, the generating roll is started. In the generating roll, the work rotates on its axis 86 and simultaneously the cutter is moved relative to the work about the axis 87 of the basic generating gear of which the cutter represents a tooth. During roll in one direction, the work rotates angularly from a position, such as denoted at 85' in Fig. 8, where the cutter is cutting at the small end of a tooth space, to a position, such as denoted at 85'', where the cutter has completed its cut on one side 95 of the tooth space at the large end thereof. During this movement of the work, the cutter moves simultaneously through the distance 97 from the position 90 to the position 90'', its axis moving from 91 to 91' (Fig. 7). Thus during roll in one direction, the convex side 95 of the pinion tooth is generated for its whole length from the small to the large end thereof and a concave surface 96 is cut on the opposite side of the tooth space from the small to the large end thereof. By proper selection of the ratio of roll, the side 95 of the tooth space will very closely approximate the shape of the finished convex surface desired. In fact, there need only be left on that side of the tooth space, the amount of stock required for a light finishing cut. The opposite side 96 of the tooth space will, however, depart considerably from the desired concave tooth shape, lacking the necessary taper etc.

The cutter movement is continued in the described direction long enough for the cutter to move from the position 90'' to the position indicated in dotted lines at 90₁ (Fig. 7). The cutter is then at a distance 98 (Fig. 8) from its position 90 at the beginning of the roll. In this movement, the cutter axis moves from 91' to 91'' (Fig. 7). Cutter and blank are then rolled back to starting position.

In this return roll, the work rotates, through the same angle as during the uproll, but the cutter has to move back through the distance 98 which is greater than the distance 97 of its movement on the uproll. Thus, the ratio of roll employed between cutter and work on the return roll must be changed from that employed on the uproll.

As illustrated in Fig. 9, during the return roll the side cutting edges 93 of the cutter remove stock from the concave side of the tooth space between the lines 96 and 96', completing the roughing of the tooth space of the pinion to a desired lengthwise taper in width. It will be noted that on the return roll the principal cutting is done at the large end of the pinion as will be clear from the fragmentary section denoted at 85₂ in Fig. 9, while only a slight cut is taken at the small end of the pinion tooth as denoted in the section 85₁ which corresponds in position to section 85'. 85₂ is a position intermediate the position 85'' and the position 85' or 85₁.

At the completion of the return roll, the cutter is withdrawn from engagement with the work and the work is indexed to bring a new tooth space of the pinion into position to be cut. It is noted that in the illustrated embodiment of the invention, which is the usual case, the ratio of the pinion rotation to the cradle rotation is larger on the uproll, when the convex side of the pinion tooth space is being formed, than on the downroll, when the concave side is being generated.

For cutting gears or pinions according to the present invention a generating machine may be employed in which the cutter axis is arranged parallel to the cradle axis. Preferably an adjustment will be provided for offsetting the axis of the work spindle from the axis of the cradle. Such an adjustment serves not only for the cutting of hypoid pinions, but may be used also to advantage in combination with the change in ratio of roll to produce a desired tooth profile shape on either a spiral bevel or a hypoid pinion. The variation in ratio of roll may be obtained by moving the cradle driving worm axially. It will be understood, of course, that the machine should have also such conventional features as axial adjustment of the work head, adjustment in the direction of the cradle axis and suitable adjustment to permit the cutter center to be placed at different distances from the cradle axis for cutting gears of different spiral angle and of different cone distance.

A gear cutting machine such as is illustrated and described in the pending application of Leonard O. Carlsen, Serial No. 305,876, filed November 24, 1939, Patent No. 2,302,004, patented November 17, 1942, may be employed with but slight change for practicing the present invention. This machine is provided with means for modifying the ratio of roll while rolling in one direction. A machine constructed to operate according to the present invention should be provided with means for changing the ratio of roll, so that different ratios of roll may be used while rolling in opposite directions. One practical way of obtaining different ratios of roll, when rolling in opposite directions, on the known-type machine is illustrated somewhat diagrammatically in Fig. 10 of the accompanying drawings. Here 100 denotes the face-mill gear cutter. This cutter is journaled in a carrier 101 with its axis 102 parallel to but eccentric of the axis 103 of the carrier. The carrier is, in turn, mounted for rotatable adjustment on a cradle 105 whose axis is at 106 parallel to but eccentric of the axis 103 of the carrier. The cutter is driven through spur gears 107 and 108, bevel gears 109 and 110, the bevel pinion 111 and the bevel gear 112. The latter is secured to the cutter. The spur gears 107 and 108 are mounted, respectively, to be coaxial of the axes 106 and 103 of the cradle and carrier. The cradle is rotated by a worm 115 which meshes with the worm wheel 116 that is secured to the cradle. The worm 115 is integral with a shaft 117 that is driven by a bevel gear 118 which has a sliding key or spline connection with the shaft. The bevel gear 118 is driven in time with the train of gearing for rotating the work spindle, and the same gearing may be employed as is described in the Carlsen application. The gear 118 and the train of gearing, which drives the work spindle, are driven alternately in opposite directions to produce the forward and return rolls.

When the Carlsen machine is modified for practicing the present invention, the worm 115, which is reciprocable axially, may be moved axially by operation of a cam 120 which is driven from the gear 118. There is a spur gear 121 keyed to the gear 118 and this spur gear meshes with a spur gear 122 which is keyed to a shaft 123 that is mounted parallel to the worm shaft 117. The shaft 123 drives a shaft 124 through spur gears 125 and 126, the stub shaft 127, and the spur gears 128 and 129. There is a worm 130 integral with the shaft 124 and this worm meshes with a worm wheel 131 which is secured to the shaft 132 to which the cam 120 is keyed. Through the described gear train, it will be seen, then, that the direction of rotation of the cam 120 is reversed on reversal of the direction of rotation of the gear 118 at opposite ends of the generating roll.

The shaft 132 extends through an elongated slot 133 in a slide 136, which is mounted for reciprocation axially of the worm shaft 117, and the slide 136 is secured to the worm shaft so that movement of the slide causes axial movement of the worm 115. The worm shaft is journaled in a bearing 138 which is secured by a ring 139 to the slide 136. A nut 137 which threads on the worm shaft serves to hold the bearing 138 in position on the worm shaft.

The cam 120 is adapted to be engaged alternately with the spaced abutments 135 and 135' formed on the slide 136.

The abutments are held in engagement with the periphery of the cam 120 by hydraulic pressure. There is a piston rod 142 integral with or secured in any suitable manner to the slide 136. A piston 141 is integral with this piston rod. This piston reciprocates in a stationary cylinder 140. Flow of pressure fluid to opposite sides of the piston 141 is controlled by a series of four valves which are shown diagrammatically in Figs. 10 to 12, inclusive, being denoted at 143, 144, 145 and 146. The upper valves 143 and 144 control the admission of the pressure fluid to the cylinder 140 while the lower valves 145 and 146 control the connection of the cylinder with the exhaust lines leading to the sump of the machine.

Fig. 10 shows the positions of the parts at the end of the uproll when a cut is taking place at the large end of a tooth space. During the operation of the machine, the cutter rotates continuously on its axis in one direction. In the uproll, the worm shaft 117 may be driven in the direction of the arrow 147 by the bevel gear 118, causing the cradle to rotate in the direction of the arrow 148 and the cam 120 to rotate in the direction of the arrow 149. At this time, the cam 120 is in engagement with the abutment 135 of slide 136, pressure between the cam 120 and the abutment 135 being maintained by keeping pressure valve 143 and exhaust valve 146 open while pressure valve 144 and exhaust valve 145 are closed. Thus the worm 115 will be moved axially to the right to the position shown in Fig. 10. This movement, in combination with the rotary motion of the worm under actuation of the gear 118, produces the uproll movement of the cradle, which is timed to the rotation of the pinion blank because the work spindle is driven in time with the gear 118.

At the end of the uproll, the slide 136 is shifted to cause the cam 120 to contact with the abutment 135'. This is effected by opening valves 144 and 145 and closing valves 143 and 146 so that the valves assume the positions shown in Fig. 11. During the return roll, the cutter continues to rotate in engagement with the pinion in the same direction as during the uproll, but the directions of rotation of the work and of the cradle and of the cam 120 are reversed. The cam 120 therefore continues to move the worm 115 axially to the right during the return roll but the direction is now opposite to the direction of the cradle rotation. Hence, the effect of the axial movement of the worm 115 during the return roll is the reverse of its effect during the uproll. If it accelerates the movement of the cradle during the uproll, it decelerates the movement of the cradle during the return roll, and vice versa. In other words, the ratio of the cradle rotation to the work rotation is different during the return roll from the ratio during the uproll as is desired. The position of the cutter relative to the axis of the cradle remains unchanged, however.

At the end of the return roll, after the cutter has been withdrawn from engagement with the work, the valves 143, 144, 145 and 146 are shifted to close the valves 144 and 145 and open the valves 143 and 146, as shown in Fig. 12, thereby causing the abutment 135 to be returned into engagement with the cam 120. This may be done while the blank is being indexed. The piston 141 and slide 136 then move to their extreme right positions until stopped by engagement of the cam 120 with the abutment 135. The pinion is then fed back into engagement with the cutter and the cycle of operation of the machine begins anew.

Figure 13:
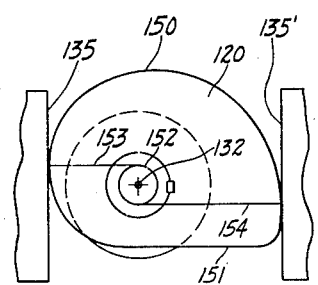
Figs. 13, 15 and 16 are diagrammatic views illustrating different positions of a given control cam during up and down rolls of a machine operating according to the present invention.
Figure 15:
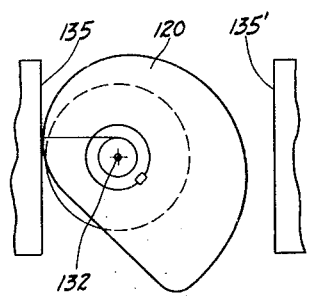
Figure 16:
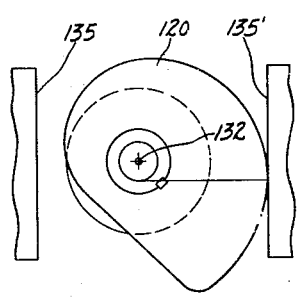

Figs. 13, 15 and 16 show different positions of the control cam 120 at different points in the roll. Thus, Fig. 13 shows the position of the cam at one end of the roll, when the cutter is cutting at the small end of a pinion tooth space. Here the cam is shown in contact simultaneously with the two abutments 135 and 135'. This condition will be present when the point width of the cutter is exactly equal to the width of the tooth slot of the pinion at the small end of the slot.

Fig. 15 shows the position of the cam 120 at the other end of the roll when the cutter is cutting at the large end of a tooth space with its outside cutting edges. Here the cam is still in engagement with the abutment 135. Fig. 16 shows the cam in contact the abutment 135' at the beginning of the return roll when the cutter is cutting at the large end of the tooth space with its inside cutting edges.

Figure 14:
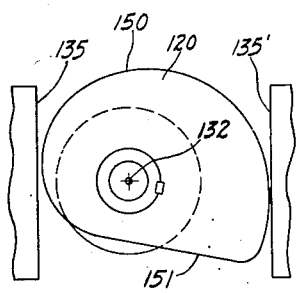
Fig. 14 is a view similar to Fig. 13, but illustrating how the control cam may be employed where the point-width of the cutter is less than the width of the tooth spaces of the pinion at the small end.

Fig. 14 shows an arrangement where the cam 120 is so positioned that at the end of the roll, when the cutter is cutting with its outside cutting edges at the small end of the tooth space, the cam will contact with the abutment 135' and the backlash between the cam and the abutment will correspond to the difference between the point width of the cutter and the width of the tooth slot of the pinion at the small end. At the end of the uproll, the slide 136 is shifted to compensate for this difference.

Figs. 13 to 16, inclusive, show different positions of a cam 120 when cutting pinions having teeth of one hand of spiral. When it is desired to produce pinions of the opposite hand of spiral, the cam can simply be reversed on the shaft 132 if the cam bore is straight.

The cam 120 shown in Figs. 10 and 13 to 16, inclusive, is a uniform motion cam having a surface 150 of involute form extending part way around its periphery and connected at its opposite ends by a connecting portion 151 which may be of any desired shape. The involute portion 150 has a base circle 152 (Fig. 13) concentric with the axis of the shaft 132, and the normals 153 and 154, etc., to the involute portion 150 are tangent to this base circle. The two abutments 135 and 135' simply engage with different portions of the involute curve 150 during the up and down rolls.

Figure 17:
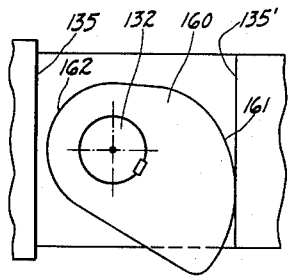
Fig. 17 is a corresponding view showing a control cam for producing a modification in ratio of roll during roll in one direction only.

Fig. 17 shows a cam which is so shaped that the entire change in ratio of roll is effected during roll in one direction only. This cam 160 has a spiral or involute portion 161, that is adapted to engage the abutment 135' during roll in one direction, and a circular portion 162 which is concentric with the axis of the shaft 132 and which is adapted to engage the abutment 135 during roll in the opposite direction. The ratio of the gearing between the cradle worm 115 (Fig. 10) and the work spindle is then so selected as to give the desired ratio of roll between the cutter and the work during the time that the portion 162 of the cam 160 is in engagement with the abutment 135, while the cam 160 is used to modify said ratio of roll during roll in the opposite direction.

Figure 18:
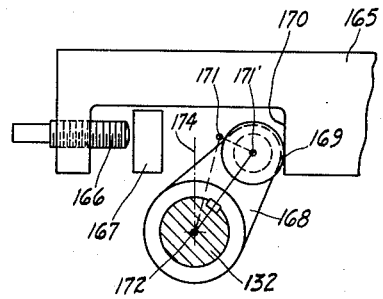
Fig. 18 is a similar view but illustrating a more flexible and universal type of mechanism for producing the axial movement of the cradle worm to effect variation in the ratio of roll.

Fig. 18 shows a similar but more flexible arrangement. Here motion is transmitted to the cradle worm through a slide 165 which may be secured to the cradle worm in the same way as is the slide 136 of Fig. 10. This slide carries an adjustable screw or stop 166 which is adapted to engage a stationary lug 167 when the slide 165 is moved over to the right. The engagement of the the screw 166 with the abutment 167 serves to prevent axial movement of the cradle worm during roll in one direction and serves the same function, therefore, as the circular portion 162 of the cam 160 shown in Fig. 17. The change in ratio of roll is produced solely in one direction, then, by rotation of the arm 168, which may be driven through a worm and worm wheel in the same way as is the cam 120 of Fig. 10. The arm 168 carries a roller 169 which is adapted to engage an abutment 170 on the slide 165. The eccentric or roller 169 produces a slight variation in the rate of movement of the slide 165 and, therefore, in the rate of axial movement of the cradle worm, as the center of the roller moves from point 171 to point 171' during the swing of the arm 168 about the axis 172 of the shaft 132 on which it may be mounted. This variation in velocity and ratio of roll may be varied at will. It may be increased or reduced by shifting the arc of swing of the arm 168 away from or toward the line 174. This mechanism provides therefore not only a means for varying the ratio of roll between up and down rolls but also a means for controlling the shape of the pinion teeth during roll in both directions. In this way greater control over the profile shape of the pinion teeth cut is possible.

Figure 19:
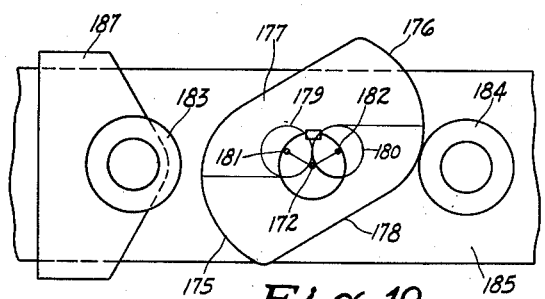
Fig. 19 is a corresponding view showing a form of cam that might be employed when "Formate" spiral bevel pinions are to be cut.

Fig. 19 shows a type of cam that can be employed with advantage in the cutting of "Formate" spiral bevel pinions. Such pinions have, of course, tooth profile shapes different from the involute profiles produced when both members of a pair of gears are generated conjugate to a crown gear. The contour of the cam here employed consists of two eccentric involutes 175 and 176 and of the connecting portions 177 and 178. The involutes 175 and 176 have base circles 179 and 180, respectively, whose centers 181 and 182, respectively, are offset from the turning center 172 of the cam and include an obtuse angle with one another. Just to indicate the possible scope of modification of the invention, I have shown in Fig. 19 rollers 183 and 184 used as abutments instead of flat surfaces. These rollers are secured to the slide 185 which may be connected to the worm shaft 117 in the same manner as the slide 136. Roller 183 is shown mounted on a block 187 which is slidably adjustable on the slide 185 so as to vary the distance between the two rollers or abutments.

Figure 20:
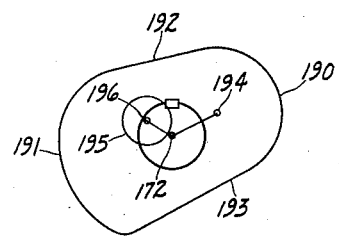
Fig. 20 is a view of a cam suited for "Formate" hypoid pinions.

Fig. 20 shows a form of cam such as is suitable for use in the production of "Formate" hypoid pinions. Its periphery is composed of an eccentric circular arc 190, an eccentric involute portion 191 and connecting portions 192 and 193. The arc 190 has its center at 194 offset from the axis 172 of rotation of the cam. The involute portion of the cam surface has a base circle 195 whose center is at 196 also offset from the axis 172 of the cam. The centers 194 and 196 include an obtuse angle with each other.

Instead of using a cam to effect the modification in ratio of roll, a control member, such as is illustrated diagrammatically in Figs. 21 to 28 inclusive, may be employed for this purpose. This control member consists simply of a pair of rollers 200 and 201 which are mounted in any suitable way to be jointly adjustable on a rotary head 204 with respect to their common axis of rotation 172 which coincides with the axis of the shaft 132. The head 204 is intended to be driven in one direction during the up roll and in the opposite direction during the return roll, just like the cam 120, so that one roller is effective during up roll and the other effective during return roll.

The rollers may be adjustable in the direction of their connecting line 203 and preferably, also, in a direction perpendicular thereto. With such an arrangement, it is possible to use the same control member on all jobs that are to be cut on a given generating machine. Plane abutments 205 and 205' like the abutments 135 and 135' may be used with these rollers but preferably one or both of these abutments are made adjustable in the direction of travel of the slide 206 to which they are secured.

Figure 21:
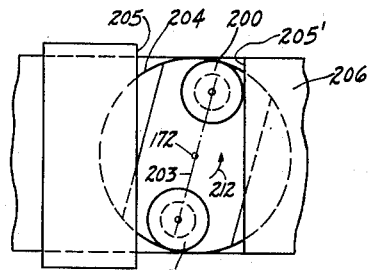
Figure 22:
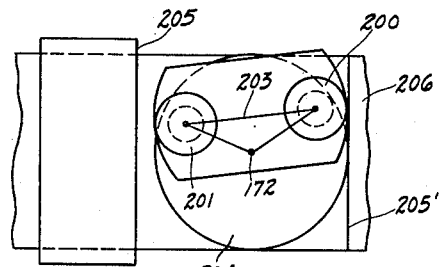
Figure 23:
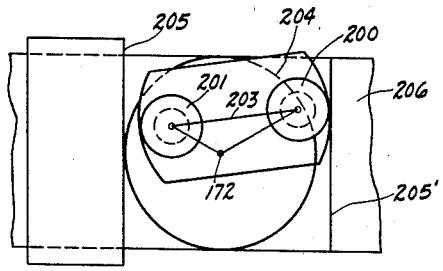

Figs. 21 to 28, inclusive, show different possible positions of the rollers for a mean point of the roll. Fig. 21 shows a mean position of the rollers when cutting a spiral bevel pinion conjugate to a generated gear or when cutting a generated gear. Fig. 22 shows a mean position of the rollers when cutting a "Formate" spiral bevel pinion, that is, a pinion conjugate to a non-generated gear. It will be noted by comparing Fig. 22 with Fig. 21 that not only do the rollers occupy a different angular position about the axis 172, but that the two rollers have also been adjusted together in a direction perpendicular to the line 203 connecting their centers. Fig. 22 also shows the abutments spaced apart at a greater distance than in Fig. 21. The difference between the positions of Figs. 21 and 22 is based then on adjustment of the rollers on the head 204 and on the change gears 125, 126, 128 and 129 selected to drive the head 204 and shaft 132. Fig. 23 shows a mean position of the rollers when cutting a "Formate" hypoid pinion. By comparing Fig. 23 with Fig. 22 it will be seen that a further adjustment of the rollers on carrier 204 has been made. The rollers have been adjusted in the direction of their connecting line 203 so that the roller 200 is at a greater distance from the axis 172 than is the roller 201.

The rollers produce the maximum rate of change in ratio of roll when the line of connection of the center of a roller with the axis 172 is perpendicular to the straight abutment with which the roller engages, for at that point, the slide 206 has zero velocity and maximum acceleration according to the well known laws of harmonic motion. If it be assumed that in each of the Figs. 21 to 23, inclusive, the control member is rotating about the axis 172 in the direction of the arrow 212 and that the roller 200 is in engagement with its abutment 205', then it can be considered that the control member is being used for controlling the ratio of roll during cutting of the concave side of left hand pinions or gears during the uproll of the generating machine, that is, during a generating roll in which, as shown in Fig. 8, the small end of a tooth space is engaged first and the large end last. When the rollers are arranged as shown in Figs. 22 and 23, the line connecting the center of the roller 200 with the axis 172 is nearer to being perpendicular to the abutment surface 205' when the cutter is cutting at the small end of the pinion tooth than when it is cutting at the large end of the tooth space. It will be seen, then, that when the rollers are adjusted as shown in Figs. 22 and 23, the control member will produce a change in ratio of roll which decreases during the roll when cutting with the outside blades of the cutter with the roller 200 in contact with the abutment 205'. The opposite is true when cutting with the inside blades of the cutter with the roller 201 in engagement with the abutment 205. The change in ratio of roll on "Formate" pinions, then, is made to decrease when the direction of roll is such that the cutter cuts first at the large end of the tooth space and then at the small end thereof.

Figure 24:
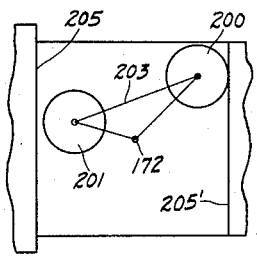

Fig. 24 shows how the control member may be adjusted for a mean point of the roll for cutting a "Formate" spiral bevel pinion which is conjugate to a "Formate" gear of larger pitch angle than the pinion which is to be cut with the settings shown in Fig. 22. Inasmuch as such a pinion has a tooth shape more nearly approaching that of a generated pinion, less modification in ratio of roll is required during the roll. The modification is controlled primarily by the speed of rotation of the plate 204 which carries the rollers. Therefore, to reduce the modification, the rotation of the roller plate is slowed down by use of different change gears 125, 126, 128 and 129. To keep the same percentage of ratio change in spite of this reduction, the connecting line 203 of the rollers is inclined more inasmuch as the vertical distance between the centers of the two rollers is the other factor controlling change in ratio of roll.

Figure 25:
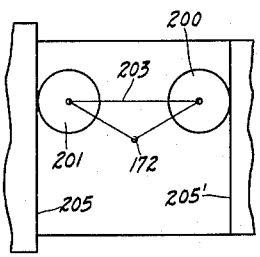
Figure 26:
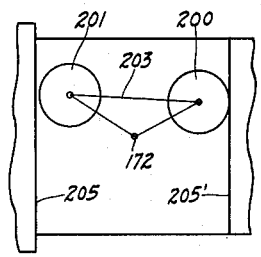

Figs. 25 and 26 show positions of adjustments of the control member for less frequent forms of "Formate" spiral bevel pinions. Fig. 25 shows how the rollers may be adjusted for a mean point of the roll when the center of curvature of one side of a tooth space of the pinion is at the same distance from the crown gear axis as is the center of curvature for the other side of the tooth space. The pressure angles of the cutting edges for opposite sides of the teeth may then be equal to the root line pressure angles and no change in ratio of roll for cutting the opposite sides of the tooth spaces is required. Fig. 26 illustrates the position of adjustment of the rollers at a mean point of the roll when the center of curvature of the concave side of a tooth space of the pinion is at a less distance from the axis of the basic generating gear than is the center of curvature of the convex side of the pinion tooth space. The ratio of roll and the cutter pressure angles are then changed in a direction opposite to that previously described. The pressure angle of the outside cutting edges of the cutter is reduced and the pressure angle of the inside cutting edges increased. The desired change in ratio of roll is obtained by setting the control member so that the line 203 of centers is tilted in the opposite direction from the tilt of Figs. 21 to 24, inclusive. When the connecting line 203 is horizontal at a mean point of roll, as illustrated in Fig. 25, there is no change in ratio of roll. Conditions such as referred to in Figs. 25 and 26 may occur when the cutter diameter is unusually small as compared with the cone distance of the pinion to be cut.

Fig. 27 illustrates an adjustment of the control member for a condition similar to Fig. 24 but where the pinion is of opposite hand. Fig. 28 shows an adjustment of the control member for conditions similar to that referred to in regard to Fig. 23 except that the pinion is of opposite hand. The rollers 201 and 200 have been adjusted along the connecting line 203 of their centers as well as angularly about the axis 172.

The described settings of the control member are not obligatory. They are merely based upon experience in securing desirable cutting conditions and indicate the universality of use of the roller-type control member. In all cases it is assumed, of course, that the abutments 205 and 205' are held in engagement with the rollers by hydraulic pressure or other suitable means. It is to be noted that, since the rollers are mounted eccentrically of their turning axis 172, they serve not only to permit variation in the ratio of roll between up and down rolls, but also variation in ratio of roll during actual cutting on both the up and down rolls. Thus the roller-type control member permits complete control not only of lengthwise taper in width of the tooth slots but also of the shapes of the tooth surfaces of the pinion or gear being cut.

Figs. 29 to 31, inclusive, show one way in which a roller-type control member may be constructed to have the desired adjustments, illustrated in Figs. 21 to 28, inclusive. 215 denotes an enlarged head or face plate which may be formed integral with or be secured to the shaft 132. This plate or head 215 has a corrugated front face, the corrugations 216 of which may be obtained by cutting rack teeth in the front of the plate 215 in two directions at right angles to one another. 218 is a plate which is adapted to be adjustably mounted on the head 215 and which is provided with studs 219 and 219' on which are mounted the rollers 220 and 220'. The rear face of the plate 218 is formed with a rack tooth 222 and it has keys 223 secured in it which serve to provide another rack tooth extending at right angles to the rack tooth 222. The rack teeth 222 and 223 are adapted to engage in the grooves between corrugations of the head 215. As will be clear, then, the roller plate 218 may be adjusted lengthwise or laterally to any desired position on the face plate 215 through an integral number of rack pitches and it will be located precisely by the rack teeth 222 and 223. The roller plate 218 is secured in position after adjustment by means of a screw 224 which is threaded in a yoke member 225 that engages the back-face of the head 215 or is secured in any other suitable manner to the head 215.

When a gear generating machine is provided with a control member of the type shown in Figs. 29 to 31, inclusive, and having adjustments such as illustrated in Figs. 21 to 28, inclusive, it will be seen that four different means are provided for varying the ratio of generating roll between cutter and work and that by different combinations of these four means, different ratios of roll may be obtained. These four means are the lengthwise and lateral adjustments of the roller plate 218 on the face plate 215, the angular position of the face plate at the mean position of roll, and the ratio change gears between the face plate and the cradle worm. These adjustments give great flexibility to the process of the present invention, so great indeed that all jobs within the range of a given generating machine may be handled with a single roller plate if desired.

In Fig. 32, there is shown another form of control mechanism for securing the desired modification in ratio of roll. Here a cam 230 is provided that is intended to be geared to the other parts of the machine so that it rotates at a uniform velocity continuously in one direction and once per cycle of operation of the machine, that is, once per tooth space. With such a cam, only a single abutment is required.

This abutment may take the form of a roller 231 which is mounted in a slide 232 in which the cradle worm 115 is journaled. The cradle worm may be driven from the shaft 233 through a sliding spline connection. Engagement between the roller 231 and the cam 230 is maintained by means of a coil spring 234 which is interposed between the slide 232 and a stationary lug or abutment 235. Of course, hydraulic pressure might be used in place of the spring. The arrangement illustrated in Fig. 32 results in a simpler machine design but it requires a large number of special cams. In fact, for accurate work, a different cam would be required for each job.

In the preceding description, it has been assumed that the cutters employed are standard straight-sided face-mill gear cutters. When straight sided face-mill cutters are employed, however, for cutting pinions by the process of this invention, tooth profiles are sometimes generated which vary somewhat from the profiles desired on the finished pinion. The amount of profile modification increases as the spiral angle of the pinion decreases. Thus at thirty degrees or thirty-five degrees spiral angle, the profile curvature of the pinion would be so modified that the amount of profile tooth bearing or contact between the pinion and its mating gear would be less than would be acceptable on a finished job of high quality.

If it is desirable, however, the profile contact of the pinion may be widened, when cutting pinions of low spiral angle, by use of a cutter having outside cutting edges of convex profile. Such a cutter is shown at 240 in Fig. 33. The blades 241 of this cutter have outside cutting edges 242 of convex profile but inside cutting edges 243 of straight profile. In the form illustrated, the outside cutting edges have a large radius of curvature, the center of the profile of the blades shown being at 244 beyond the cutter axis 245.

Other forms of cutters may be used, also, with the present invention. Thus, as illustrated in Fig. 34, a cutter 250 may be employed having cutting blades 251 whose outside cutting edges 252 are of convex profile but whose inside cutting edges 253 are of concave profile. In this case, the radius of curvature 256 of the convex side cutting edges of the cutter is less than the radius of curvature 257 of the concave inside cutting edges and less, also, than the radius of curvature 246 of the convex outside cutting edges of the cutter shown in Fig. 33.

The present invention is not limited to roughing, but may be employed for semi-finishing or finishing, and either of the cutters 240 or 250 may be employed for a finishing operation.

Now while the present invention provides a method for generating hypoid gears and pinions with tooth spaces tapering in width from end to end without change of radial position of the cutter and merely by change in ratio of generating roll during cutting of opposite sides of the teeth, it is to be noted that the change in ratio of roll may be combined with an automatic set over of the cutter between roll in opposite directions if desired. Such a combination of movements may be of advantage in the cutting of gears and pinions having zero spiral angle. It may be of advantage, also, where a wide range of work is to be cut with a small number of cutters.

Fig. 35 illustrates diagrammatically such a combination of motions. Here 260 denotes a developed section of a spiral bevel pinion which is to be cut. The axis of this pinion is indicated at 261 and its apex at 262. 263 denotes the position of the cutter at the middle of the uproll. The axis of the cutter is then at the position 264. Cutter and blank roll together during the uproll as in the previously described embodiments of the invention, but at the end of the uproll, the cutter is shifted so that at the middle of the return roll its axis is in position 264' and the cutter itself assumes the position indicated in dotted lines at 263'. It cuts in this position during the return roll with a roll different from that employed during the uproll according to the previously described principles of this invention. The amount of shift of the cutter is determined by the taper of the tooth spaces desired, since the change in roll serves, for a pinion of zero spiral angle, primarily as a means of controlling the shape of the tooth profiles.

A still further method of cutting pinions of zero spiral angle is illustrated in Figs. 36 and 37. Here, instead of setting over the cutter, the pinion itself is set over laterally at the end of the roll. The convex side of a pinion tooth is cut during the uproll with the inside cutting edges of the cutter 270 and while the axis 271 of the pinion 272 is offset below the axis 273 of the generating gear or cradle. The position shown in Fig. 36 is a position at the middle of the uproll and the axis of the cutter here is at 274. The amount which the pinion axis 271 is offset below center is equal to half the point width 275 of the cutter. At the end of the uproll, the work is shifted so that the pinion axis assumes the position 271' shown in Fig. 37, which is offset the same amount above the cradle axis 273 as the work axis was offset below the cradle axis in Fig. 36. In the middle of the return roll, the cutter then assumes the relative position indicated at 270' in Fig. 37. The radial distances 276 and 276' to the cutter axis for the two different relative positions are equal. A change in roll is also employed so that a different roll is used during the return roll from that used during the uproll.

The method of the present invention is particularly advantageous in the cutting of "Formate" pinions, since it permits closer roughing. With the cutter set-over previously employed, a taper in width of tooth slot is obtainable, but while this is sufficient for generated pinions it does not permit sufficiently close roughing for "Formate" pinions. Correct profiles as well as correct taper are obtained with the process of the present invention.

A further advantage of the present method is that it permits of setting all of a group of roughing machines to produce the same job. Differences in finishing machines may readily be compensated for by such slight adjustments of the individual machines as may be shown to be necessary after testing the pinions cut on the machines. The procedure for checking roughed pinions has, however, heretofore been so complicated that it was necessary to set up all the roughing machines alike and to allow additional stock to be left on the roughed tooth surfaces over and above the amount required to be removed in the finishing cut so as to take care of possible machine variations over the whole battery of roughing machines. With the process of the present invention, the tooth surfaces of the pinion can be roughed so close to the finished tooth shape, that a roughed pinion can actually be run on a testing machine. This not only simplifies the development of the roughed pinions, but it also makes it possible to do with the roughing machines what has heretofore been done commonly only with the finishing machines, namely, to correct for variations in individual machines. With the present invention, then, it is possible to rough cut the pinions in such a way as to leave on them only that slight amount of stock required for rapid and accurate finishing.

With the method of the present invention, moreover, the point width of the roughing cutter can be increased over the point width of a cutter used in the conventional roughing process. Moreover, by using a cutter having a smaller pressure angle than the pressure angle of the tooth surfaces to be cut, the point width of the cutter can be increased still further and the profiles of the pinion teeth can be relieved or undercut near their roots so as to relieve the points of the finishing cutters of much if not all of the burden of cutting. By providing a radius at the points of the cutting blades of the roughing cutter, a well rounded fillet can be cut on the pinion teeth. With the increased point width of the roughing cutter, more stock is removed during the uproll so that, if desired, the return roll may be accelerated, thereby materially reducing the cutting time.

While the invention has been described in connection with a particular embodiment thereof, it will be understood that it is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting opposite sides of the tooth spaces of a longitudinally curved tooth tapered gear in a single cycle of operation which comprises rotating a face-mill gear cutter having opposite side-cutting edges in cutting engagement with a tapered gear blank while producing a relative rolling movement between the cutter and the blank at full-depth cutting position first in one direction to cut one side of a tooth space and then in the other direction to cut the opposite side of the tooth space, the ratio of the rolling movement being modified during roll in one direction at least.

2. The method of cutting the tooth spaces of a longitudinally curved tooth tapered gear which comprises rotating a face-mill gear cutter having opposite side-cutting edges in full-depth cutting engagement with a tapered gear blank while producing a relative rolling movement between the cutter and the blank first in one direction and then in the other to cut one side of a tooth space of the blank and then the other, the ratio of the rolling movement between cutter and blank being modified during roll in both directions, but being differently modified during roll in one direction from that during roll in the opposite direction.

3. The method of cutting the tooth spaces of a longitudinally curved tooth tapered gear which comprises rotating a face-mill gear cutter, that has opposite side-cutting edges, in cutting engagement at full-depth cutting position with a tapered gear blank while producing a relative rolling movement between the cutter and blank first in one direction and then in the other to cut first one side of a tooth space of the blank and then the other, the ratio of the relative rolling movement of the cutter and blank being different when rolling in one direction from that when rolling in the opposite direction.

4. The method of cutting tooth spaces of a longitudinally curved tooth tapered gear which comprises employing a face-mill gear cutter that has side cutting edges at one side whose pressure angle is greater than the root line pressure angle of the gear to be cut and at the opposite side whose pressure angle is less than the root line pressure angle of the gear to be cut, and rotating said cutter in full-depth cutting engagement with a tapered gear blank while producing a relative rolling movement between the cutter and blank first in one direction and then in the other to cut first one side of a tooth space of the blank and then the other, the ratio of the rolling movement between cutter and blank being different when rolling in one direction from that when rolling in the opposite direction, the ratio of roll being greater when the side-cutting edges of smaller pressure angle are doing the final cutting.

5. The method of cutting the tooth spaces of a longitudinally curved tooth tapered gear which comprises rotating a face-mill gear cutter, that has opposite side cutting edges, in cutting engagement with a tapered gear blank while producing a relative rolling movement between the cutter and blank at full-depth cutting position first in one direction and then in the other about an axis parallel to the cutter axis, and maintaining the cutter axis at the same radial distance from the axis about which the rolling movement takes place during roll in both directions, but employing a different ratio of roll in one direction from that employed when rolling in the opposite direction.

6. The method of cutting tooth spaces of a longitudinally curved tooth tapered gear which comprises rotating a face-mill gear cutter, that has opposite side-cutting edges, in cutting engagement with a tapered gear blank while producing a relative rolling motion between the cutter and blank first in one direction and then in the other, and shifting the position of the cutter radially of the axis about which said relative rolling motion takes place, between roll in opposite directions, and employing a different ratio of roll when rolling in one direction from that employed when rolling in the opposite direction, one side of a tooth space being cut during roll in one direction and the opposite side during roll in the opposite direction.

7. The method of cutting tooth spaces of a longitudinally curved tooth tapered gear which comprises rotating a face-mill gear cutter that has opposite side-cutting edges in cutting engagement with a tapered gear blank while producing a relative rolling motion between the cutter and blank first in one direction and then in the other about an axis offset from the blank axis, the offset being different when rolling in one direction from that when rolling in the opposite direction, and the ratio of relative roll of cutter and blank being different when rolling in one direction from that when rolling in the opposite direction, one side of a tooth space being cut during roll in one direction and the opposite side during roll in the opposite direction.

8. The method of cutting tooth spaces of a longitudinally curved tooth tapered gear which comprises employing a face-mill gear cutter that has opposite side cutting edges, the side cutting edges of one side being of convex profile shape, and rotating said cutter in full-depth cutting engagement with a tapered gear blank while producing a relative rolling motion between the cutter and blank first in one direction and then in the other, the ratio of relative roll of cutter and blank being different when rolling in one direction from that when rolling in the opposite direction, one side of a tooth space being cut during roll in one direction and the opposite side during roll in the opposite direction.

9. The method of cutting tooth spaces of a longitudinally curved tooth tapered gear which comprises employing a face-mill gear cutter that has opposite side cutting edges and an effective point-width less than the width of the tooth spaces to be cut at the small ends thereof, rotating said cutter in cutting engagement with a tapered gear blank while producing a relative rolling motion between the cutter and blank at full cutting depth first in one direction and then in the other, and effecting a relative displacement between the cutter and blank about the axis about which said rolling movement takes place, at the end of the roll in one direction, so that a tooth space of the desired width may be cut on the return roll, the ratio of the relative rolling motion between cutter and blank being different when rolling in one direction from that when rolling in the opposite direction.

10. In a machine of the intermittent indexing type for producing longitudinally curved tooth gears and having a rotary work support, a tool support, a face-mill gear cutter journaled in the tool support and a cradle on which one of said supports is mounted, means for rotating the cutter on its axis, means for rotating the work support at a uniform velocity first in one direction and then in the other, and means for rotating the cradle first in one direction and then in the other in timed relation with the rotation of the work support but at a non-uniform velocity to effect generation of the tooth profiles, said last named means being so constructed as to effect movement of the cradle at a different non-uniform rate in one direction from the other, whereby to produce different variations in the ratio of rotation of the work support and cradle during their timed movements in opposite directions.

11. In a machine of the intermittent indexing type for producing longitudinally curved tooth tapered gears and having a rotary work support, a rotary cradle, a face-mill gear cutter journaled in the cradle with its axis parallel to the axis of the cradle, means for rotating the cutter on its axis, means comprising a worm wheel which is secured to the cradle and a worm meshing therewith for rotating the cradle means for driving said worm first in one direction and then in the other in time with corresponding rotation first in one direction and then in the other of the work support, and means for moving the worm axially independently of its rotation at one varying velocity during rotation of the cradle in one direction and at a differently varying velocity during rotation of the cradle in the opposite direction so that the ratio of roll between the cradle and the work is different when rolling in opposite directions.

12. In a machine of the intermittent indexing type for producing longitudinally curved tooth gears, a rotary work support, a face-mill gear cutter having opposite side cutting edges, means for rotating the cutter, and means for producing a relative rolling movement between the cutter and work support first in one direction and then in the other while the cutter and work are in cutting engagement at full-depth cutting position, and means for modifying the ratio of said relative rolling movement to a different extent during roll in one direction from that during roll in the opposite direction.

13. In a machine of the intermittent indexing type for producing longitudinally curved tooth tapered gears and having a rotary work support, a tool support, a rotary cradle on which one of said supports is mounted, a face-mill gear cutter journaled in the tool support, means for rotating the cutter, and means comprising a worm wheel which is secured to the cradle and a worm meshing therewith for rotating the cradle first in one direction and then in the other in time with corresponding rotation of the work support first in one direction and then in the other, and means driven in time with the worm for reciprocating the worm axially at different velocities, respectively, during the timed movement of the cradle and work support in opposite directions.

14. In a machine of the intermittent indexing type for producing longitudinally curved tooth tapered gears and having an oscillatory work support, a tool support, an oscillatory cradle on which one of said supports is mounted, a face-mill gear cutter journaled in the tool support, means for oscillating said cutter, means for rotating the work support, and means comprising a worm wheel, which is secured to the cradle, and a worm meshing therewith for oscillating the cradle in time with the oscillation of the work support, means for reciprocating the worm comprising an oscillatory control member, means for driving said control member from the worm, and means operatively connecting the worm to the control member, said control member being constructed to impart axial movement to the worm at a different rate during the timed movement of the cradle and work support in one direction from that imparted during the timed movement of said parts in the opposite direction.

15. In a machine of the intermittent indexing type for producing longitudinally curved tooth tapered gears and having a rotary work support, a tool support, a rotary cradle on which one of said supports is mounted, a face-mill gear cutter journaled in the tool support, means for rotating the cutter, means for oscillating the work support, means for oscillating the cradle in time with the oscillation of the work support, comprising a worm wheel, which is secured to the cradle, a worm meshing therewith, and means for oscillating the worm, means for reciprocating the worm axially comprising a rotary plate, a pair of rollers mounted on the plate in spaced relation eccentrically of the axis of rotation of the plate, a pair of followers adapted to engage, respectively, with the two rollers, means operatively connecting the followers with the worm, and means for oscillating the plate in time with the oscillation of the worm.

16. In a machine of the intermittent indexing type for producing longitudinally curved tooth tapered gears and having a rotary work support, a tool support, a cradle on which one of said supports is mounted, a face-mill gear cutter journaled in the tool support, means for rotating the cutter, means for oscillating the work support, and means for oscillating the cradle in time with the work support comprising a worm wheel which is secured to the cradle, a worm meshing therewith, and means for oscillating the worm, means for reciprocating the worm axially comprising a rotary plate, a set of change gears for oscillating the plate in time with the oscillation of the worm, a pair of rollers mounted on the plate for adjustment in two directions at right angles to one another, a pair of followers, each of which is adapted to engage one of said rollers, means operatively connecting the followers with the worm, and means for holding one of the followers against one roller during movement of the cradle in one direction and the other follower against the other roller during movement of the cradle in the opposite direction.

17. In a machine of the intermittent indexing type for producing longitudinally curved tooth tapered gears, a work support, a tool support, a face-mill gear cutter journaled in the tool support and having opposite side-cutting edges, a rotary cradle on which one of said supports is mounted, means for rotating the cutter, means for oscillating the work support, means for oscillating the cradle in time with the oscillation of the work support comprising a worm wheel which is secured to the cradle, a worm meshing therewith, and means for oscillating the worm, and means for imparting a different axial movement to the worm during movement of the cradle in one direction from that during movement of the cradle in the opposite direction.

18. In a machine of the intermittent indexing type for producing longitudinally curved tooth tapered gears, a work support, a tool support, a face-mill gear cutter journaled in the tool support and having opposite side-cutting edges, a rotary cradle on which one of said supports is mounted, means for rotating the cutter, means for effecting alternate relative depthwise feed and withdrawal movements between the tool and work supports, means for oscillating both the cradle and work support in timed relation at a uniform velocity, and means for imparting an additional relative movement between the cradle and work support about the axis of said parts, when the cutter and work support are in full depth cutting position, which is different during movement of said part in one direction from that during movement of the part in the opposite direction and which is at a varying velocity during movement in one direction at least.

19. The method of generating the tooth spaces of a tapered gear which comprises imparting a cutting movement to a tool while rolling the tool and a gear blank in full-depth cutting engagement first in one direction to generate one side of a tooth space and then in the opposite direction to generate the other side of the tooth space, and modifying the ratio of the rolling movement during the roll in both directions.

20. The method of generating the tooth spaces of a tapered gear which comprises imparting a cutting movement to a tool while rolling the tool and a gear blank in full-depth cutting engagement first in one direction and then in the other about an axis offset from the blank axis, and shifting the position of the blank between the rolling movements in opposite directions so that the offset between the axis of the blank and the axis of roll is different for opposite directions of roll, one side of a tooth space being generated during roll in one direction and the opposite side of the tooth space being generated during roll in the opposite direction.

21. The method of generating the tooth spaces of a tapered gear which comprises imparting a cutting movement to a tool while rolling the tool and a gear blank in full-depth cutting engagement, first in one direction and then in the other about an axis offset from the axis of the blank, and shifting the position of the blank between the rolling movements in opposite directions so that the axis of the blank is offset equal distances at opposite sides of the axis of roll during the roll in opposite directions, respectively, one side of a tooth space being generated during roll in one direction and the opposite side of the tooth space being generated during roll in the opposite direction.

22. The method of generating the tooth spaces of a tapered gear which comprises imparting a cutting movement to a tool while rolling the tool and a gear blank in full-depth cutting engagement first in one direction and then in the other about an axis offset from the blank axis, and shifting the blank position between the rolling movements in opposite directions so that the offset between the axis of the blank and the axis of the roll is different during the roll in opposite directions, and employing a different ratio of roll when rolling in one direction from that when rolling in the opposite direction, one side of a tooth space being generated during roll in one direction and the opposite side of the tooth space being generated during roll in the opposite direction.

23. The method of generating the tooth spaces of a tapered gear which comprises imparting a cutting movement to a tool while rolling the tool and a gear blank in full-depth cutting engagement first in one direction and then in the other about an axis offset from the blank axis, and shifting the position of the blank between the rolling movements in opposite directions so that the offset between the blank axis and the axis of roll is different during roll in opposite directions, and modifying the ratio of roll during the roll in one direction at least, one side of a tooth space being generated during roll in one direction and the opposite side of the tooth space being generated during roll in the opposite direction.

24. The method of generating the tooth spaces of a tapered gear which comprises imparting a cutting movement to a tool while rolling the tool and a gear blank in full-depth cutting engagement first in one direction and then in the other about an axis offset from the blank axis, and shifting the position of the blank between the rolling movements in opposite directions so that the offset between the axis of the blank and the axis of roll is different during roll in the opposite directions, and modifying the ratio of roll during roll in both directions, the variation in ratio of roll being different during roll in one direction from that during roll in the other direction, one side of a tooth space being generated during roll in one direction and the opposite side of the tooth space being generated during roll in the opposite direction.

25. The method of generating the tooth spaces of a tapered gear which comprises rotating a face-mill gear cutter, that has opposite side cutting edges, in full-depth cutting engagement with a tapered gear blank while producing a relative rolling movement between the cutter and blank first in one direction and then in the other about an axis parallel to the cutter axis, and maintaining the cutter axis at the same radial distance from the axis of roll during roll in both directions, but modifying the ratio of roll between cutter and blank during roll in one direction at least, one side of a tooth space being generated during roll in one direction and the opposite side of the tooth space being generated during roll in the opposite direction.

26. The method of generating the tooth spaces of a tapered gear which comprises rotating a face-mill gear cutter, that has opposite side cutting edges, in full-depth cutting engagement with a tapered gear blank while producing a relative rolling movement between the cutter and blank first in one direction and then in the other about an axis parallel to the cutter axis, and maintaining the cutter axis at the same radial distance from the axis of roll during roll in both directions, but modifying the ratio of roll between cutter and blank during roll in both directions, the variation in ratio of roll being different during roll in one direction from that during roll in the other direction, one side of a tooth space being generated during roll in one direction and the opposite side of the tooth space being generated during roll in the opposite direction.

27. The method of generating the tooth spaces of a tapered gear which comprises rotating a face-mill gear cutter, that has opposite side cutting edges, in full-depth cutting engagement with a tapered gear blank while producing a relative rolling motion between the cutter and blank first in one direction and then in the other, and shifting the position of the cutter radially of the axis about which said rolling motion takes place, between rolls in opposite directions, and modifying the ratio of roll between cutter and blank during roll in one direction at least, one side of a tooth space being generated during roll in one direction and the opposite side of the tooth space being generated during roll in the opposite direction.

28. The method of generating the tooth spaces of a tapered gear which comprises rotating a face-mill gear cutter, that has opposite side cutting edges, in full-depth cutting engagement with a tapered gear blank while producing a relative rolling motion between the cutter and blank first in one direction and then in the other, and shifting the position of the cutter radially of the axis about which the rolling motion takes place, between rolls in opposite directions, and modifying the ratio of roll between cutter and blank during the roll in both directions, the variation in ratio of roll being different during roll in one direction from that during roll in the other, one side of a tooth space being generated during roll in one direction and the opposite side of the tooth space being generated during roll in the opposite direction.

29. In a gear generating machine, a work support, a tool support, a tool mounted on the tool support, a work spindle journaled in the work support, an oscillatory cradle on which one of said supports is mounted, means for actuating the tool, means for rotating the work spindle, a worm wheel secured to the cradle, a worm meshing therewith, means for rotating the worm alternately in opposite directions in time with the rotation of the work spindle to oscillate the cradle in opposite directions, and means for moving the worm axially during the movements of the cradle comprising a shaft, a rotary plate mounted on the shaft for angular adjustment about the axis of the shaft, a pair of rollers mounted on the plate for adjustment thereon radially of the axis of the plate, a pair of followers, one of which is engageable with each roller, operatively connected to the worm, and means including a set of change gears for driving the plate in time with the rotation of the worm.

30. In a machine of the intermittent indexing type for generating gears, a work support, a tool support, a tool mounted on the tool support, a work spindle journaled in the work support, an oscillatory cradle on which one of said supports is mounted, means for actuating the tool, means for oscillating both the cradle and work spindle in timed relation to effect forward and return generating rolls, and means for producing a different ratio of roll on the forward roll movement from the return roll movement comprising a rotary control member, a pair of spaced abutments adapted to be engaged selectively with said rotary control member at opposite sides of the axis of said member, means operatively connecting said abutments with the cradle to impart movement to the cradle on rotation of the control member, means for shifting said abutments at opposite ends of the cradle movement to move one abutment out of engagement and the other into engagement with the control member, and means for rotating the control member in opposite directions, respectively, on movement of the cradle in opposite directions.

31. In a machine of the intermittent indexing type for generating gears, a work support, a tool support, a tool mounted on the tool support, a work spindle journaled in the work support, an oscillatory cradle on which one of said supports is mounted, means for actuating the tool, means for oscillating both the cradle and the work spindle in timed relation to effect forward and return generating rolls comprising a wormwheel which is secured to the cradle, a worm meshing therewith, and means for rotating the worm in time with the rotation of the work spindle, and means for moving the worm axially to vary the ratio of the relative rolling movement comprising a rotary control member, means for rotating said control member in opposite directions, respectively, on movement of the cradle in opposite directions, a pair of spaced abutments which are connected to said worm and which are adapted to be engaged alternately with said control member at opposite sides of the axis of the control member, respectively, and means for shifting the worm axially at opposite ends of the cradle movement to move one abutment out of engagement with and the other abutment into engagement with the control member.

32. In a machine for generating gears, a work support, a work spindle journaled in the work support, a tool support, a face mill gear cutter journaled in the tool support, means for rotating the cutter on its axis, means for effecting alternate relative feed of the cutter and work into and out of full depth cutting engagement, means for effecting alternate forward and return rolling movements between the cutter and work support, while cutter and work are in full depth engagement, to generate opposite tooth sides, respectively, means for shifting the angular position of the cutter about the axis of roll between the forward and return roll movements and for resetting the cutter to original position at the end of the return roll, means for controlling the ratio of the rolling movements, while the cutter and work are in full depth engagement, so that the ratio of the movements of the cutter and work support is different during roll in one direction from that during roll in the opposite direction, and means for periodically indexing the work spindle.

33. In a machine for generating gears, a work support, a work spindle journaled in the work support, an oscillatory cradle, a face mill cutter journaled in the cradle, means for rotating said cutter, means for effecting alternate relative feed of the cutter and work into and out of full depth cutting engagement, means for rotating the cradle and work spindle in timed relation, while the cutter and work are in full depth engagement alternately in opposite directions to effect forward and return generating movements, means for moving the cradle on its axis independently of its generating movement at the end of each forward generating movement to change the angular position of the cutter about the cradle axis and for resetting the cradle to initial position at the end of each return generating movement, means for controlling the ratio of the generating movements while the cutter and work are in full depth engagement so that the ratio of movement of the work spindle and cradle is different during the forward generating movement from that during the return generating movement, and means for periodically indexing the work spindle.

ERNEST WILDHABER.